United States Patent [19]
Wislinski

[11] Patent Number: 6,042,043
[45] Date of Patent: Mar. 28, 2000

[54] APPARATUS AND METHOD FOR WINDING AN OPTICAL FIBER

[75] Inventor: Martin T. Wislinski, Edison, N.J.

[73] Assignee: Tyco Submarine Systems Ltd., Morristown, N.J.

[21] Appl. No.: 09/256,766

[22] Filed: Feb. 24, 1999

Related U.S. Application Data

[63] Continuation-in-part of application No. 09/163,390, Sep. 30, 1998.

[51] Int. Cl.[7] ............................. B65H 54/12; B65H 54/20; B65H 54/547
[52] U.S. Cl. ................................. 242/473.9; 242/388.6; 242/405.2; 242/474.8; 242/487
[58] Field of Search .......................... 242/473.9, 474.8, 242/486.8, 486.9, 487, 388.6, 388.1, 388.5, 405, 405.1, 405.2, 405.3, 129.71; 385/135

[56] References Cited

U.S. PATENT DOCUMENTS

| | | | |
|---|---|---|---|
| 3,208,121 | 9/1965 | Price | 242/388.1 |
| 3,355,129 | 11/1967 | Kinsey | 242/388.6 |
| 3,809,331 | 5/1974 | Gaul | 242/395 |
| 4,386,621 | 6/1983 | Redl | 242/388.6 |
| 4,489,902 | 12/1984 | Chaconas et al. | 242/388.1 |
| 4,557,430 | 12/1985 | Bonhard | 242/405.3 |
| 4,762,286 | 8/1988 | Crow | 242/486.9 |
| 4,796,827 | 1/1989 | Munt, III et al. | 242/388.6 |

*Primary Examiner*—John M. Jillions
*Attorney, Agent, or Firm*—Brian K. Dinicola

[57] ABSTRACT

A fiber winding and storage assembly is disclosed. The fiber winding and storage assembly includes a fiber winding fixture and a fiber storage device. The fiber winding fixture may include a winding structure, a handle member, and a mounting member. The winding structure has a first side and a second side where the first side defines a recess therein. The handle member is disposed on the second side of the winding structure. The mounting member is disposed within the recess of the winding structure and extends perpendicularly therefrom. The fiber storage device is received within the recess of the fiber winding fixture. In a second embodiment for the fiber winding fixture, the winding fixture also includes a push button and a biasing member. The push button is mounted in the handle member and biased to a first position within the fiber winding fixture. A user is able to apply a force to the push button from a location under the handle member to overcome the biasing force and extend a portion of the push button up through the recess of the winding structure. When the push button is pushed by a user to extend up through the recess, the push button assists the user in removing a fiber storage device that is positioned within the fiber winding structure from the winding structure.

23 Claims, 11 Drawing Sheets

APPARATUS AND METHOD FOR WINDING AN OPTICAL FIBER

This application is a continuation-in-part of pending application Ser. No. 09/163,390 filed Sep. 30, 1998.

BACKGROUND OF THE INVENTION

The present invention relates to an apparatus and method for winding optical fiber. More specifically, the invention provides a fiber storage device and a fixture for assisting in winding a fiber onto the storage device.

The storage device has two storage tracks which extend around the circumference of the device and the two tracks are separated from each other by a center wall. The storage device is designed to store a length of fiber that is jacketed on one portion of the fiber length and unjacketed on the second portion of the fiber length. The jacketed portion is wound in one track of the storage device and the unjacketed portion is wound in the second track of the storage device. The center wall contains an opening within it. The transition point between the unjacketed fiber and the jacketed fiber, where the unjacketed fiber is stored in one track and the jacketed fiber is stored in the second track of the storage device, is placed within the opening in the center wall. Thus, a cross-over can occur through the center wall between the unjacketed fiber and the jacketed fiber in order to store each portion of the fiber length in a separate track.

There are problems, however, with winding the fiber onto the storage device. Typically, the different portions of the fiber, i.e., the unjacketed fiber and the jacketed fiber, will cross-over from one track to the other track. For example, the jacketed portion, which is to be stored in one of the tracks will, during the winding process, cross-over and be wound in the other of the tracks. This fiber cross-over between tracks can occur by the fiber either crossing over the center wall that separates the tracks or by crossing over through the opening in the wall that separates the tracks. In either situation, the fiber can be damaged by the cross-over. In the situation where the fiber crosses over the center wall, the fiber can be subjected to stresses. In the situation where the fiber crosses over through the opening in the center wall, the fiber of one type, e.g., the jacketed fiber, can be trapped underneath fiber of another type wound in that track, e.g., the unjacketed fiber, and thus possibly be broken when the operator uncoils the fiber when needed.

Therefore, it would be desirable to provide an assembly that could assist an operator in winding and storing optical fiber.

SUMMARY OF THE INVENTION

In accordance with one embodiment of the present invention, a fiber winding and storage assembly is disclosed. The fiber winding and storage assembly includes a fiber winding fixture and a fiber storage device. The fiber winding fixture may include a winding structure, a handle member, and a mounting member. The winding structure has a first side and a second side where the first side defines a recess therein. The handle member is disposed on the second side of the winding structure. The mounting member is disposed within the recess of the winding structure and extends perpendicularly therefrom. The fiber storage device is received within the recess of the fiber winding structure.

In a second embodiment for the fiber winding fixture, the fiber winding fixture also includes a push button and a biasing member. The push button is mounted in the handle member and is biased to a first position within the fixture. A user is able to apply a force to the push button from a location under the handle member to overcome the biasing force and extend a portion of the push button up through the recess in the fiber winding structure. When the push button is pushed by a user to extend up through the recess, the push button assists the user in removing a fiber storage device that is positioned within the fiber winding structure from the winding structure.

BRIEF DESCRIPTION OF THE DRAWINGS

The various features of the invention will best be appreciated by simultaneous reference to the description which follows and the accompanying drawings, in which.

DETAILED DESCRIPTION

Figure 1:
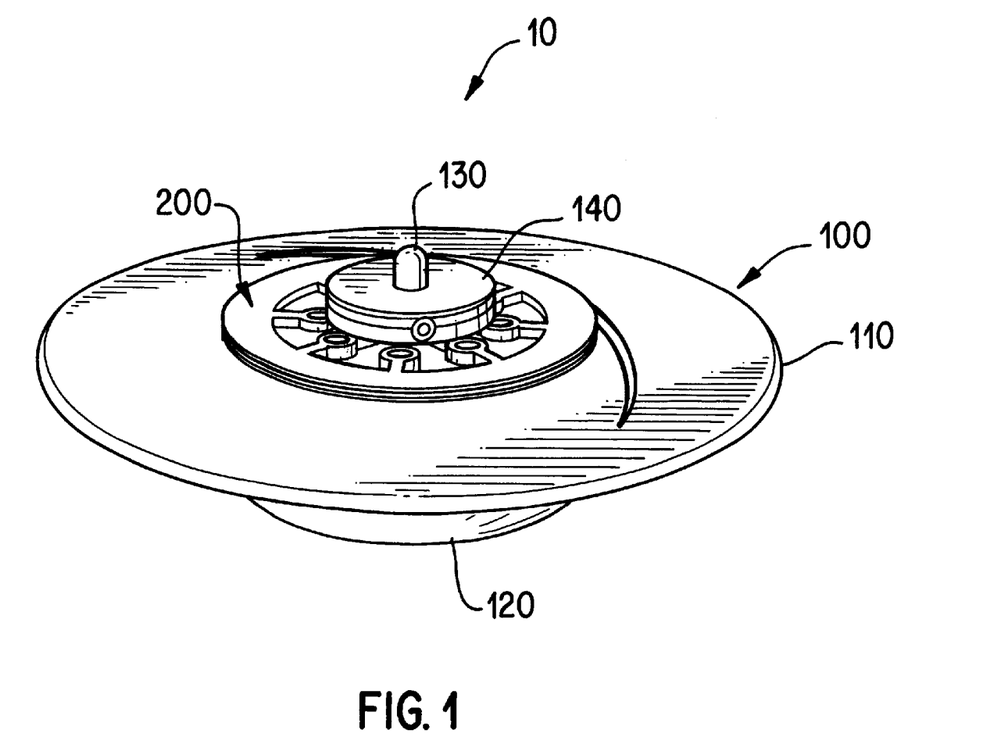
FIG. 1 is a perspective view of an embodiment of a fiber winding fixture with a fiber storage device placed within it.

FIG. 1 illustrates an embodiment for the fiber winding and storage assembly 10 of the present invention. As can be seen in FIG. 1, fiber winding and storage assembly 10 includes a fiber winding fixture 100 and a fiber storage device 200. Fiber storage device 200 is received within fiber winding fixture 100 where, as will be explained further later in this specification, winding structure 110 of fiber winding fixture 100 assists a user in winding a length of optical fiber onto fiber storage device 200.

Also illustrated in FIG. 1 is mounting member 130 and retaining member 140. As will also be further explained later in this specification, fiber storage device 200 is positioned within fiber winding fixture 100 by mounting the fiber storage device 200 on the mounting member 130. Retaining member 140 is positioned on mounting member 130 and retains fiber storage device 200 within fiber winding fixture 100. Handle member 120 is disposed on an underside, or second side, of fiber winding structure 110 and is utilized by a user of the fiber winding and storage assembly 10 to hold the fiber winding fixture 100.

Figure 2:
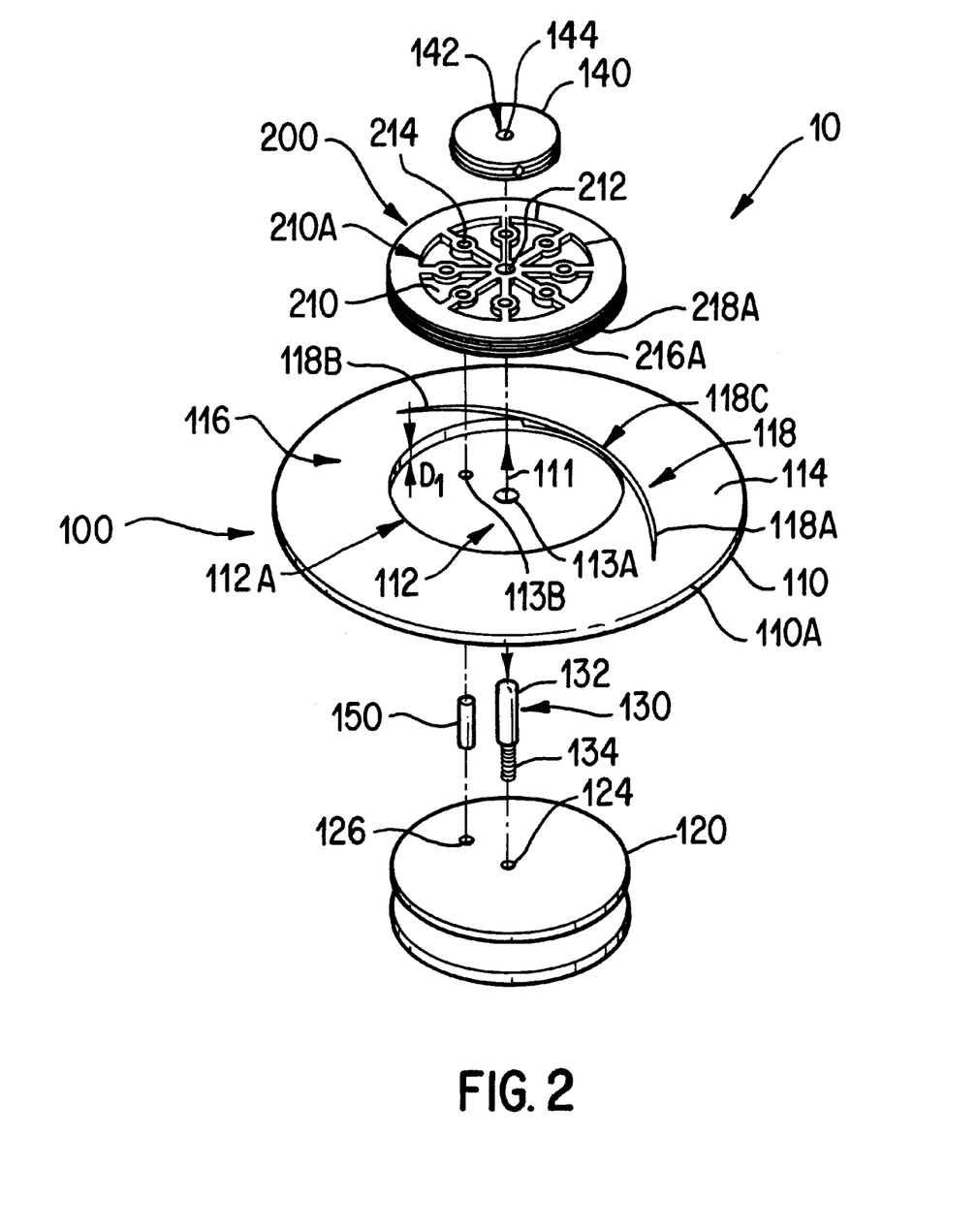
FIG. 2 is an exploded perspective view of the fiber winding fixture and fiber storage device of FIG. 1.

A more detailed description of the components of the fiber winding and storage assembly 10 will now be provided. FIG. 2 is an exploded, perspective view of fiber winding and storage assembly 10. As was mentioned previously, fiber winding fixture 100 includes a winding structure 110, a handle member 120, a mounting member 130 and a retaining member 140. Winding structure 110 is a circularly-shaped structure that includes a first side 116, or fiber winding side, and a second side, or underside, 117 (not visible in FIG. 2) on which is disposed handle member 120. First side 116 of winding structure 110 defines a recess 112 and a winding surface 114. As can be seen in FIG. 2, recess 112 is a circularly-formed recess. The depth of the recess D, is uniform across its diameter and extends, in one embodiment, a distance that is defined by the width of the lower track 216A of fiber storage device 200 plus approximately one third of the width of the upper track 218A of fiber storage device 200. Thus, as will be described further later in this specification, as fiber storage device 200 is placed into recess 112 of winding structure 110, the lower track 216A of fiber storage device 200 is completely received within recess 112. Additionally, a portion of the upper track 218A of fiber storage device 200 is also received within recess 112 of winding structure 110.

Winding structure 110, within recess 112, also defines a mounting member aperture 113A and a securement aperture 113B. Mounting member aperture 113A is positioned at the central axis 111 of winding structure 110 and securement aperture 113B is off-set a distance from central axis 111.

First side 116 of winding structure 110, as mentioned previously, defines winding surface 114. Winding surface 114 extends from the outer diameter 112A of recess 112 to the outer diameter 110A of winding structure 110. As can be more clearly seen in FIG. 7, winding surface 114 slopes from outer diameter 112A of recess 112 to outer diameter 110A of winding structure 110. The angle of the slope of winding surface 114 is approximately 9°–10°, however, a slope in the range of approximately 3°–20° is possible. As will be more fully described later in this specification, the purpose of winding surface 114, and particularly the slope of winding surface 114, is to assist a user in guiding a length of fiber into the upper track 218A of fiber storage device 200 when the user winds the length of fiber onto the fiber storage device 200.

Also included in winding surface 114 is a groove 118. As can be seen, groove 118 is comprised of a first side 118A, a second side 118B, and a transition portion 118C between the first side 118A and second side 118B. The groove 118 extends approximately around one-half of the circumference of winding structure 110. The depth of groove 118 is not rigidly defined, however, as will become more clear later in this specification, groove 118 receives within it an end portion of the jacketed fiber. Thus, groove 118 is of sufficient depth to receive within it a length of jacketed fiber such that the jacketed fiber does not extend above the plane of the winding surface 114 at least at the portion of the first and second sides 118A, 118B, respectively, of groove 118 that are closest in proximity to transition portion 118C. Transition portion 118C of groove 118 provides for an unobstructed path for a length of jacketed fiber as the jacketed fiber extends from lower track 216A of storage device 200 through recess 112 and into groove 118.

Groove 118 is formed within winding surface 114 such that as a length of unjacketed fiber is wound onto the upper track 218A of fiber storage device 200 when fiber storage device 200 has been positioned within recess 112 of winding structure 110, the groove will not interfere with the unjacketed length of fiber as it passes over winding surface 114. As the unjacketed fiber is wound onto fiber storage device 200, the unjacketed fiber extends generally perpendicular to the outer circumference of the winding surface 114; groove 118, therefore, is positioned generally perpendicular to the unjacketed length of fiber. Thus, this physical positioning of the unjacketed fiber with respect to the groove 118 as the unjacketed fiber is wound around the winding surface 114 helps to ensure that the unjacketed fiber is not oriented parallel to groove 118 which could result in the unjacketed fiber being caught within groove 118, which could possibly damage the unjacketed fiber.

Mounting member 130 is comprised of a mounting portion 132 and a threaded portion 134. Threaded portion 134 is received within first aperture 124 of handle member 120. Mounting portion 132 extends up through mounting member aperture 113A in recess 112 of winding structure 110 and extends above the upper-most horizontal plane of winding structure 110. Fiber storage device 200, which contains a mounting aperture 212 within it, is positioned on mounting member 130. Thus, in this embodiment, mounting member 130 serves to assist in positioning fiber storage device 200 within winding structure 110.

Securement member 150 is attached to handle member 120. Securement member 150 is received within second aperture 126 in handle member 120 and extends up through securement aperture 113B in recess 112 of winding structure 110. Securement member 150 is positioned on handle member 120, and consequently within recess 112, off-set from the central axis of handle member 120 and winding structure 110. Securement member 150 is received within one of a plurality of securement apertures 214 that are included in fiber storage device 200. Because securement member 150 and the securement apertures 214 of the fiber storage device 200 are offset from the central axis of the fiber storage device 200, as securement member 150 is received within one of the plurality of securement apertures 214, it prevents rotation of fiber storage device 200 within winding structure 110.

Retaining member 140 is also illustrated in FIG. 2. Retaining member 140 includes an aperture 142. Mounting member 130 is received within aperture 142 of retaining member 140. Retaining member 140 is positioned on mounting member 130 after fiber storage device 200 has been positioned within recess 112 of winding structure 110. Thus, retaining member 140 serves to retain, or lock, fiber storage device 200 within winding structure 110. Retaining member 140 should be of a lesser diameter than fiber storage device 200 such that, as retaining member 140 is utilized to secure fiber storage device 200 in winding structure 110, retaining member 140 will not impede a user from winding a length of optical fiber onto the fiber storage device 200.

Extending into aperture 142 of retaining member 140 are retention members 144. Even though all of the retention members 144 can not be seen in FIG. 2, a description of their operation and structure will make their purpose clear. Three retention members 144 are included in retaining member 140 which extend into aperture 142. Each retention member can be a ball-like structure which is biased such that it extends within a portion of aperture 142. As mounting member 130 is positioned within aperture 142 and moved through aperture 142, mounting member 130 will act upon retention members 144 and further move the retention members within retaining member 140. However, the retention members still apply sufficient force against mounting member 130 such that retaining member 140 is secured to mounting member 130. Thus, the retention members provide for securing retaining member 140 onto mounting member 130. It is not desirable to include threading within aperture 142 of retaining member 140 that would mate with threading on mounting portion 132 of mounting member 130 because any threaded surface on mounting member 130 could possibly damage the optical fiber as it is wound onto fiber storage device 200 if retaining member 140 is not utilized in conjunction with mounting member 130.

Handle member 120 is disposed on the second side, or underside, 117 of winding structure 110 and may be attached to winding structure 110 by any of a variety of methods. Handle member 120 can be formed in any of a variety of configurations and the purpose of handle member 120 is to allow a user of the fiber winding fixture 100 to hold the fiber winding fixture 100 when using it to wind fiber on the fiber storage device 200.

Also illustrated in FIG. 2 is fiber storage device 200. Fiber storage device 200 is comprised of a support structure 210 which includes on its outer circumference 210A first lower track 216A and second upper storage track 218A, as mentioned previously. Each storage track extends around the entire circumference of support structure 210. As will be further described later in this specification, fiber storage device 200 can be utilized to store a length of optical fiber on it where the optical fiber includes a first jacketed portion and a second unjacketed portion. The first jacketed portion is wound and stored within first lower track 216A and the second unjacketed portion is wound and stored on second upper storage track 218A. A more detailed view of fiber storage device 200 can be seen in FIGS. 3–5.

Figure 3:
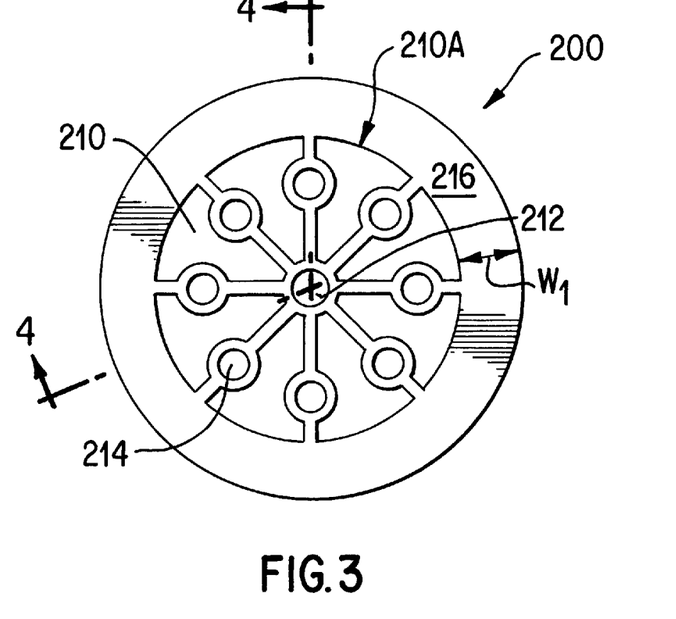
FIG. 3 is a bottom view of an embodiment of a fiber storage device.
Figure 4:
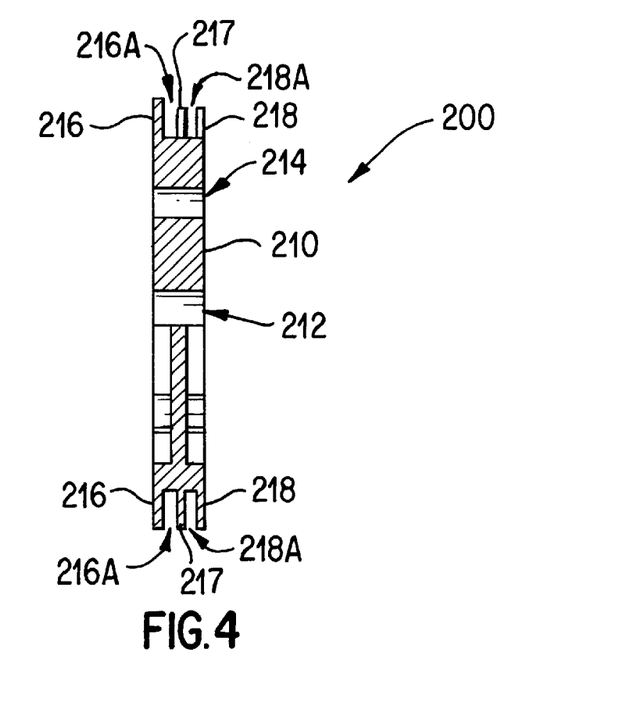
FIG. 4 is a cross-sectional view of the fiber storage device as taken along line 4—4 of FIG. 3.
Figure 5:
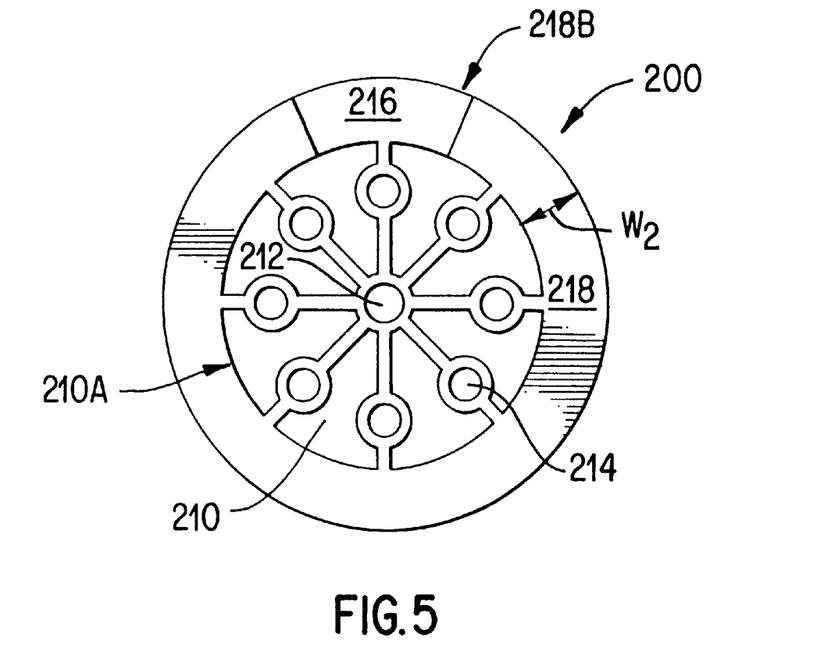
FIG. 5 is a top view of the fiber storage device of FIG. 3.

FIG. 3 is a bottom view of fiber storage device 200 and FIG. 5 is a top view of the fiber storage device. FIG. 4 is a cross-sectional view of fiber storage device 200 as taken along line 4—4 of FIG. 3. As can be seen in FIGS. 3–5, support structure 210 of fiber storage device 200 includes on its outer circumference 210A three walls which define the first lower storage track 216A and the second upper storage track 218A. As can be seen, bottom wall 216 is continuous in its width $W_1$ around the entire circumference of support structure 210. Top wall 218 and center wall 217 are not continuous in their width $W_2$ around the entire circumference of support structure 210. Thus, as can be seen in FIG. 5, an opening 218B in top wall 218 exists. A similar opening exists in the center wall 217, however, this opening can not be directly visualized in FIG. 5 since center wall 217 is disposed directly underneath top wall 218. The purpose of the opening within center wall 217 is to allow the length of fiber that is to be wound on fiber storage device 200 to transition from being wound on the lower track 216A to the upper track 218A at the location on the length of fiber where the transition from jacketed fiber to unjacketed fiber exists. Thus, the jacketed portion of the length of fiber is wound in the lower track 216A and the unjacketed portion of the optical fiber is wound in the upper track 218A with the transition between the jacketed fiber and unjacketed fiber being positioned within the opening that is included in center wall 217.

As can be clearly seen in FIG. 4 and as was described previously, bottom wall 216 and center wall 217 define lower track 216A. Top wall 218 and center wall 217 define upper track 218A. Also as was previously described, upper track 218A receives within it the unjacketed portion of the length of optical fiber that is wound on fiber storage device 200 and lower track 216A receives within it the jacketed portion of the fiber. As such, the width of the lower track 216A is slightly greater than the width of the upper track 218A. This is because, as described above, the lower track 216A stores jacketed fiber which is thicker in diameter than the unjacketed fiber. Lower track 216A is approximately 0.085 inches in width and upper track 218A is approximately 0.060 inches in width.

Figure 6:
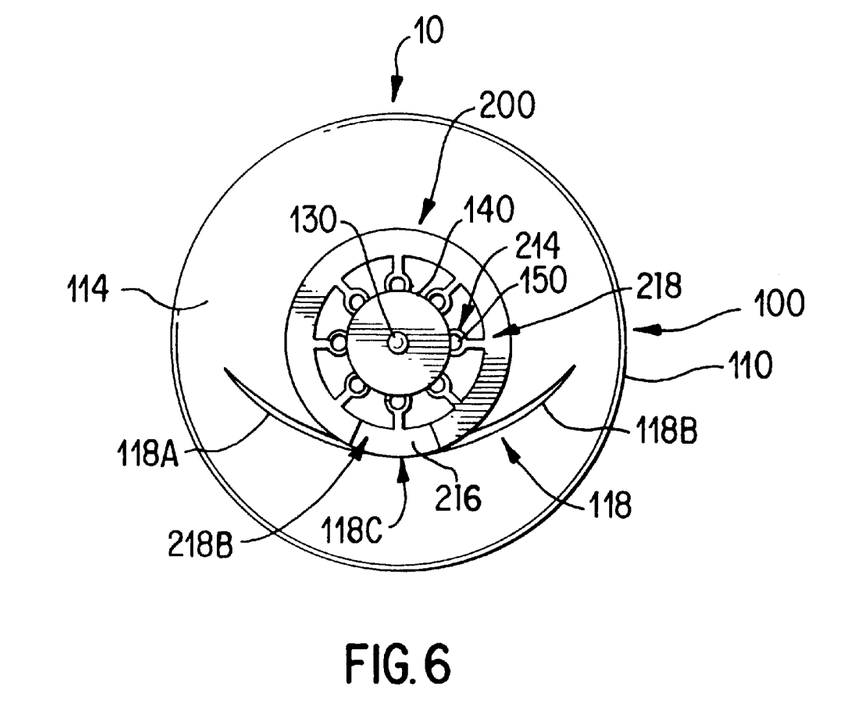
FIG. 6 is a top view of the fiber winding fixture and fiber storage device of FIG. 1.
Figure 7:
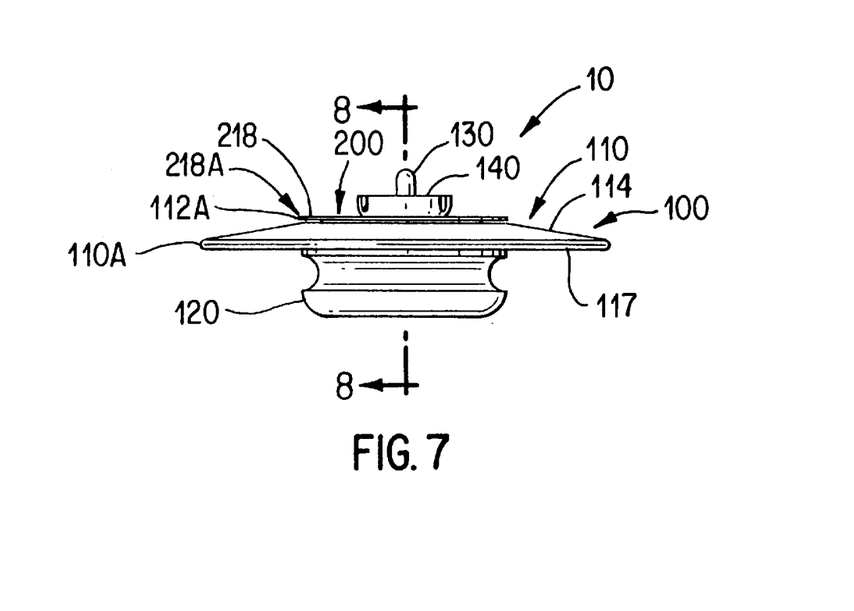
FIG. 7 is a side view of the fiber winding fixture and fiber storage device of FIG. 1.
Figure 8:
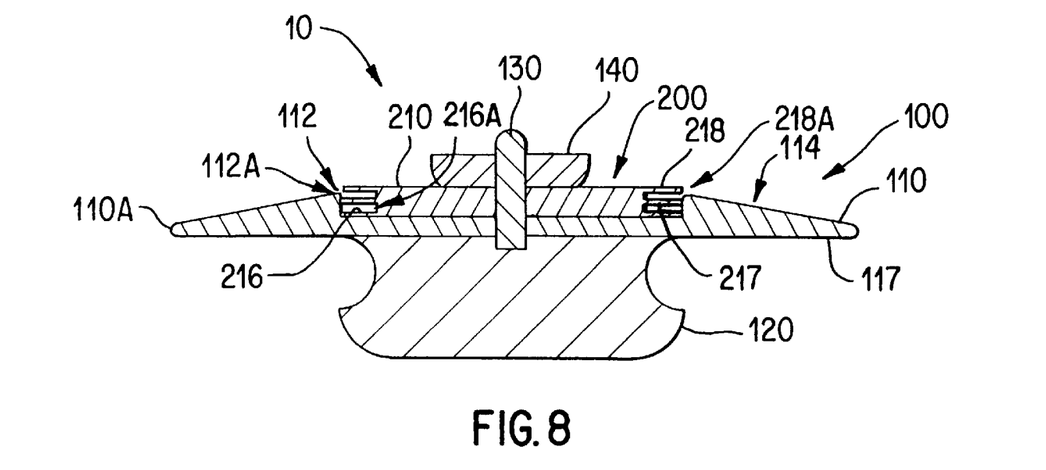
FIG. 8 is a cross-sectional view of the fiber winding fixture and fiber storage device as taken along line 8—8 of FIG. 7.

FIGS. 6 and 7 illustrate the fiber winding and storage assembly 10 of the present invention with the fiber storage device 200 positioned within fiber winding fixture 100. As can be seen in FIG. 6, securement member 150 has been received within one of the plurality of securement apertures 214 in fiber storage device 200. Thus, as mentioned previously, fiber storage device 200 is restrained against rotation within fiber winding fixture 100. As can be seen clearly in FIGS. 7 and 8, when fiber storage device 200 has been placed within recess 112 of winding structure 110, lower storage track 216A is completely disposed within recess 112 of winding structure 110. Additionally, a portion of upper track 218A is also received within recess 112 of winding structure 110. However, sufficient access to upper track 218A is provided such that the unjacketed portion of the length of fiber can be wound into upper track 218A. It can be understood by viewing FIGS. 7 and 8 that the slope of winding surface 114 will assist a user in guiding and winding the unjacketed fiber portion onto the upper storage track 218A.

The operation of the fiber winding and storage assembly 10 will now be provided. As mentioned above, the length of optical fiber that is to be stored on fiber storage device 200 consists of a jacketed portion and an unjacketed portion. For reference purposes, the jacketed portion will be described as containing a terminal end and a transition end. The terminal end is defined as the end of the jacketed portion that would be attached to another optical component and the transition end of the jacketed portion is defined as the end of the jacketed portion within the total length of fiber that transitions to the unjacketed portion. Likewise, the terminal end of the unjacketed portion is defined as the end of the overall length of optical fiber and the transition end of the unjacketed fiber is defined as the end of the unjacketed portion that transitions to the jacketed portion of the fiber.

In utilizing the present invention, prior to placing fiber storage device 200 into fiber winding fixture 100, the jacketed portion of the length of optical fiber is wound into the lower track 216A of fiber storage device 200. In winding the jacketed portion of the optical fiber into the lower track 216A, approximately one-quarter inch of the transition end of the jacketed portion is placed through the opening in center wall 217 such that it extends within the upper track 218A. This is accomplished in order to provide for a smooth transfer for the transition point in the optical fiber between the upper track and lower track. After the transition end of the jacketed portion of the optical fiber has been placed within the opening in center wall 217 as described above, the jacketed fiber is wound within the lower track 216A until there is about ten inches remaining at the terminal end of the jacketed portion. The fiber storage device 200 is then placed within the recess 112 in the winding structure 110. When the fiber storage device 200 is positioned within recess 112 of fiber winding fixture 100, the openings in the top wall 218 and center wall 217 should be placed such that they are adjacent to the transition portion 118C in groove 118, as can be seen in FIG. 6.

As can be understood, and as was described previously, as fiber storage device 200 is placed within fiber winding fixture 100, securement member 150 is aligned with one of the plurality of securement apertures 214 such that the securement member 150 is received within one of the securement apertures 214. When the fiber storage device 200 has been placed within fiber winding fixture 100, at least a portion of the terminal end of the jacketed portion is placed within groove 118. The terminal end of the jacketed portion can be taped within groove 118 in order to prevent it from exiting the groove and perhaps interfering with the unjacketed fiber as it is wound into the upper storage track 218A.

After the fiber storage device 200 has been placed within fiber winding fixture 100 and the terminal end of the jacketed portion has been placed within groove 118, the unjacketed portion of the optical fiber is then wound into the upper track 218A of the fiber storage device 200. The unjacketed fiber is guided into the upper track 218A by utilizing winding surface 114 of fiber winding fixture 100. After the unjacketed portion of the optical fiber has been wound into the upper track 218A, the terminal end of the unjacketed portion can be taped to the top of the fiber storage device 200 in order to ensure against unraveling of the unjacketed fiber from the upper storage track 218A. After the unjacketed fiber has been stored in the upper track 218A, the tape, if utilized, that was securing the terminal end of the jacketed portion of the optical fiber within groove 118 is removed. Fiber storage device 200 is then removed from fiber winding fixture 100. The terminal ends of both the jacketed portion and the unjacketed portion can then be placed within their respective tracks and thus, the total length of the optical fiber has now been stored on fiber storage device 200.

Whereas in this embodiment fiber winding fixture 100 is disclosed as including a handle member 120, a mounting member 130 and a retaining member 140, these components are not required when practicing the present invention. For example, a handle member 120 that is designed so that a user is able to hold the fiber winding fixture 100 in his/her hands is not required. Any type of securement structure could be provided on fiber winding fixture 100 that would provide for stabilizing the fiber winding fixture 100 as optical fiber is wound onto fiber storage device 200. For example, the structure of the fiber winding fixture itself, or a circular or square-shaped structure provided on the underside of the fiber winding fixture, could be utilized as the securement structure that could be, for example, grasped in a vice-like device to stabilize the fixture as fiber is wound onto it.

Whereas it was disclosed that prior to placing fiber storage device 200 into fiber winding fixture 100, the jacketed portion of the length of optical fiber is wound into the lower track 216A of fiber storage device 200, it is not required that the jacketed portion be first wound onto the storage device before placing the storage device in the winding fixture. The storage device could first be placed in the winding fixture so that the upper track 218A is received within recess 112 of winding fixture 100 and, therefore, lower track 216A is accessible. The user could then wind the jacketed portion onto the lower track 216A by utilizing the winding fixture 100 to assist the user. The user would then remove the storage device from the winding fixture, turn the storage device over, and place the storage device back into the winding fixture recess so that now the lower track 216A is received within the recess and the upper track 218A is now accessible for winding the unjacketed fiber onto it as described previously. Thus, both the jacketed fiber and the unjacketed fiber can be wound onto the storage device by utilizing the fiber winding fixture. In order to utilize the fiber winding fixture to wind both the jacketed and unjacketed portions of the fiber onto the storage device, the depth of recess 112 would have to be such that each of the storage tracks are accessible when the other of the storage tracks is received within the recess.

Figure 9:
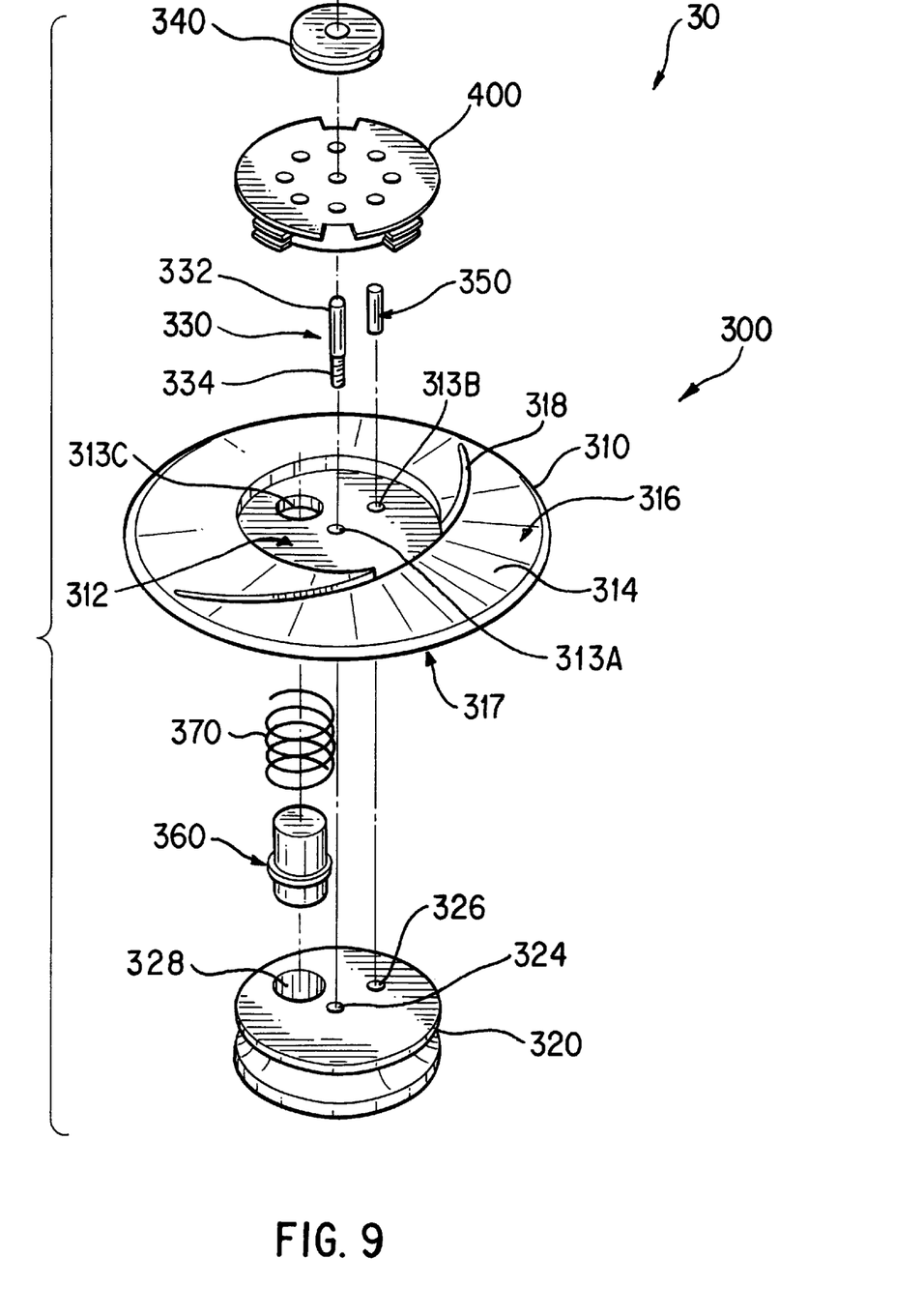
FIG. 9 is an exploded perspective view of a second embodiment of a fiber winding fixture with a fiber storage device.

FIG. 9 illustrates an alternative embodiment for a fiber winding and storage assembly. As can be seen, the fiber winding and storage assembly 30 of this embodiment also includes a fiber winding fixture 300 and a fiber storage device 400. As in the previously disclosed embodiment, fiber storage device 400 is received within fiber winding fixture 300. Since fiber storage device 400 may be formed similarly to the previously disclosed embodiment and functions in a similar manner, no further discussion will be provided for this component.

As can be seen in FIG. 9, fiber winding fixture 300 includes a fiber winding structure 310, handle member 320, mounting member 330, retaining member 340, and securement member 350. Also included in this embodiment for fiber winding fixture 300 are push button 360 and biasing member 370. As will be further explained, push button 360 is movably disposed within handle member 320 between a first position where push button 360 does not extend within the recess 312 defined by the fiber winding structure 310 and a second position where at least a portion of push button 360 extends within recess 312. By extending push button 360 within recess 312, push button 360 can engage with fiber storage device 400, when storage device 400 is positioned within recess 312, to assist a user in removing storage device 400 from winding structure 310. The component parts of fiber winding fixture 300 will now be further described.

Figure 10:
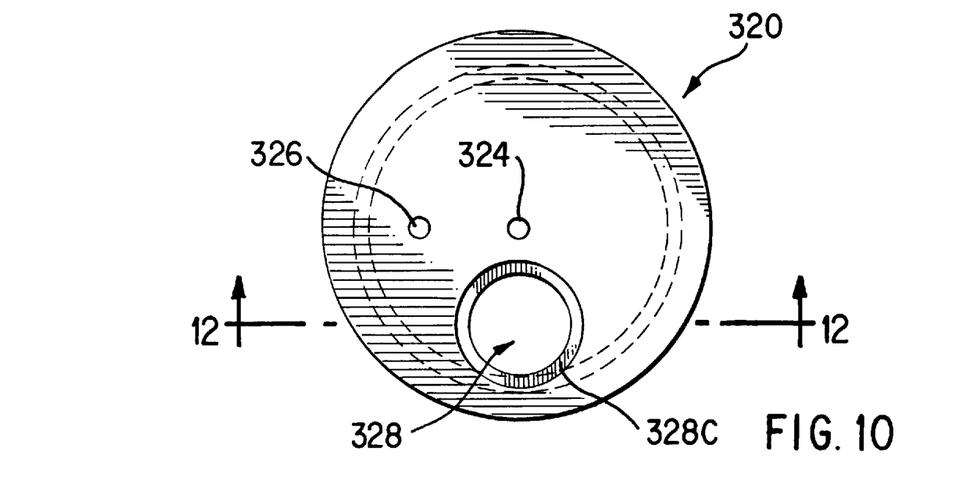
FIG. 10 is a top view of the handle member of FIG. 9.
Figure 11:
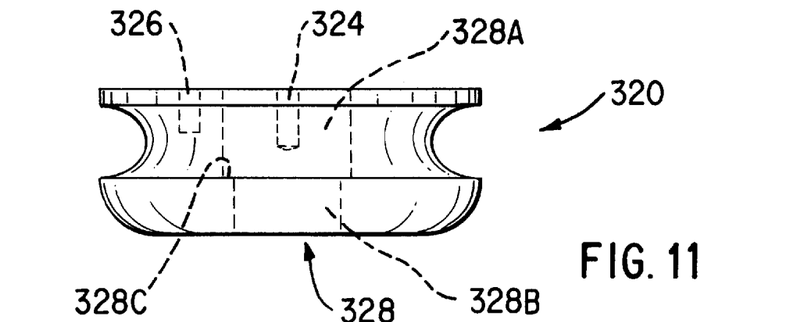
FIG. 11 is a side view of the handle member.
Figure 12:
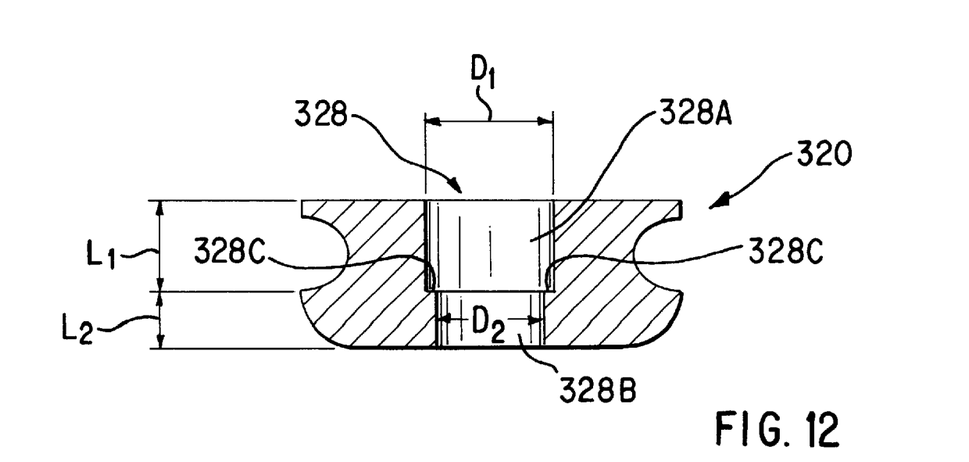
FIG. 12 is a cross-sectional view of the handle member as taken along line 12—12 of FIG. 10.

FIGS. 10–12 illustrate handle member 320 of the second disclosed embodiment. As can be seen, handle member 320 includes, as did handle member 120 of the first embodiment, a first aperture 324 and a second aperture 326. First aperture 324 receives within it threaded portion 334 of mounting member 330 and second aperture 326 receives within it securement member 350. However, handle member 320 differs from the first embodiment of handle member 120 in that handle member 320 includes a third aperture 328 which extends completely through handle member 320. As can be seen most clearly in FIGS. 11 and 12, third aperture 328 includes a first upper portion 328A and a second lower portion 328B. First upper portion 328A has a larger diameter than second lower portion 328B. As such, first upper portion 328A has a diameter $D_1$ of 0.875 inches and second lower portion 328B has a diameter $D_2$ of 0.745 inches. As a result of first upper portion 328A having a larger diameter than second lower portion 328B, a ledge 328C is formed by the structure which defines third aperture 328. As can be seen clearly in FIGS. 10 and 12, ledge 328C extends completely around the circumference of third aperture 328 and is 0.130 inches wide. First upper portion 328A has a length $L_1$ within handle member 320 of 0.625 inches and second lower portion 328B has a length $L_2$ within handle member 320 of 0.375 inches. Thus, the overall length of third aperture 328 is 1.0 inches, which is the thickness of handle member 320 since aperture 328 extends completely through handle member 320. As will be further explained later in this specification, aperture 328 receives within it push button 360 and aperture 328 is formed to be complimentary to the structure of push button 360.

Figure 13:
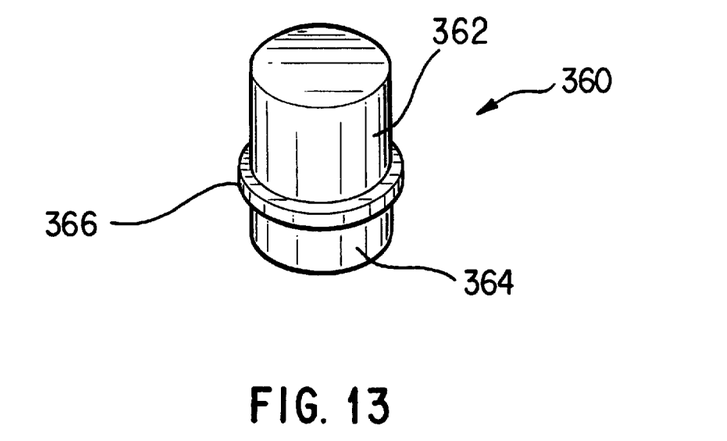
FIG. 13 is a perspective view of the push button of FIG. 9.
Figure 14:
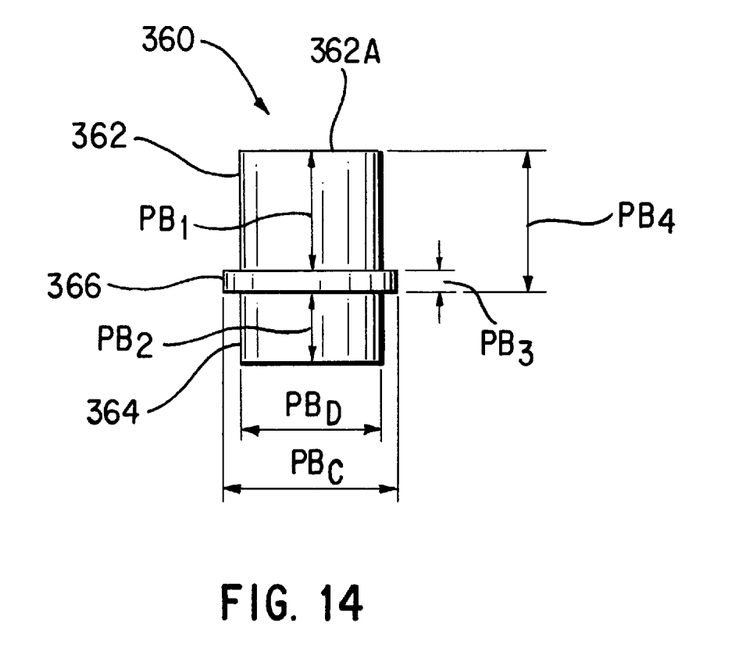
FIG. 14 is a side view of the push button of FIG. 13.

FIGS. 13 and 14 illustrate push button 360. As can be seen, push button 360 includes an upper end 362, a lower end 364, and a circumferential rim 366 which extends completely around the circumference of push button 360. As will also be further explained later in this specification, lower end 364 of push button 360 is received within second lower portion 328B of third aperture 328. Upper end 362 of push button 360 is received within first upper portion 328A of third aperture 328. Circumferential rim 366, when push button 360 is biased into its first position, engages with ledge 328C to prevent push button 360 from moving further within third aperture 328.

Figure 18:
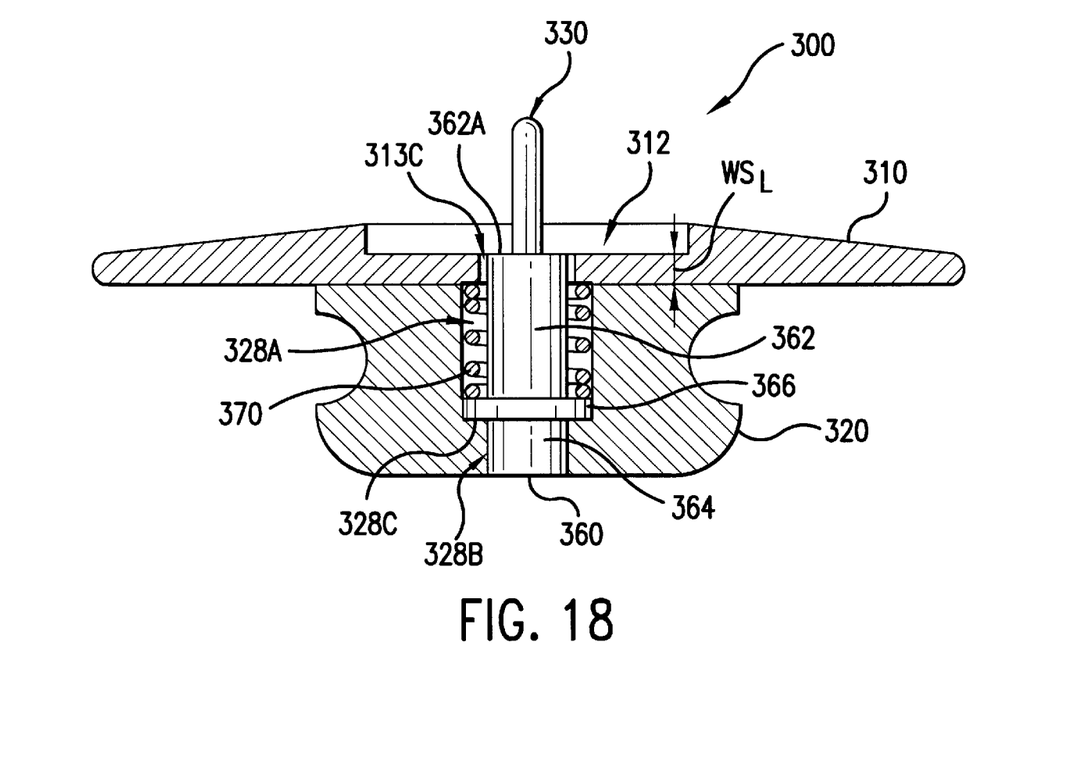
FIG. 18 is a cross-sectional view of the second embodiment for the fiber winding fixture in an assembled configuration where the push button is in its first position.

In further describing push button 360, both upper end 362 and lower end 364 have a diameter $PB_D$ of 0.715 inches. Circumferential rim 366 has a diameter $PB_C$ of 0.845 inches. Thus, as can be understood, lower end 364 of push button 360 is able to be received within second lower portion 328B of aperture 328 and upper end 362 of push button 360 is able to be received within first upper portion 328A of aperture 328. Additionally, due to the dimensions described above for circumferential rim 366 and ledge 328C, circumferential rim 366 engages with ledge 328C to prevent movement of push button 360 within aperture 328 beyond the point at which circumferential rim 366 engages with ledge 328C. As can be seen in FIG. 18, because the diameter of upper end 362 of push button 360 is 0.715 inches and because the diameter of first upper portion 328A of aperture 328 is 0.875 inches, sufficient volume is available within first upper portion 328A such that biasing member 370 may be disposed around upper end 362 of push button 360 and installed within upper portion 328A of aperture 328. As will be further explained later, biasing member 370, when it is disposed around push button 360 within aperture 328, engages at an upper end with the bottom surface of fiber winding structure 310 and at a lower end with circumferential rim 366 in order to bias push button 360 to its first position where it does not extend up into recess 312 of fiber winding structure 310.

Lower end 364 of push button 360 has a length $PB_2$ of 0.375 inches. As discussed previously, second lower portion 328B of aperture 328 has a depth of 0.375 inches. Thus, when lower end 364 of push button 360 is received within second lower portion 328B of aperture 328, the bottom of lower end 364 will be flush with the bottom of handle member 320 and will not extend beyond handle member 320 when push button 360 is biased into its first position. Upper end 362 of push button 360 has a length $PB_1$ of 0.693 inches and circumferential rim 366 extends a length $PB_3$ of 0.125 inches. Thus, the overall length $PB_4$ of the combined structures of the circumferential rim 366 and the upper end 362 is 0.818 inches. Because the overall length of the combined structures of the circumferential rim 366 and the upper end 362 is 0.818 inches and the depth of first upper portion 328A of aperture 328 is 0.625 inches, a portion of upper end 362 will extend a distance of 0.193 inches above handle member 320 and within aperture 313C of fiber winding structure 310. However, because the thickness of the structure of fiber winding structure 310 that defines aperture 313C has a thickness $WS_L$ of 0.193 inches, when push button 360 is biased into its first position, the top 362A of upper end 362 does not extend up into recess 312, but rather, is positioned flush with the surface of fiber winding structure 310 that defines the lower surface of recess 312.

FIG. 18 illustrates push button 360 in its first biased position within handle member 320 where it does not extend up into recess 312 of fiber winding structure 310. As can be seen, whereas upper end 362 of push button 360 extends above the top-most surface of handle member 320, upper end 362 does not extend above the structure of fiber winding structure 310 that defines aperture 313C, and thus, does not extend up within recess 312. In this position for push button 360, a fiber storage device 400 may be inserted within recess 312, as described previously when discussing the first embodiment, and push button 360 will not interfere with the positioning of fiber storage device 400 within recess 312.

Figure 15:
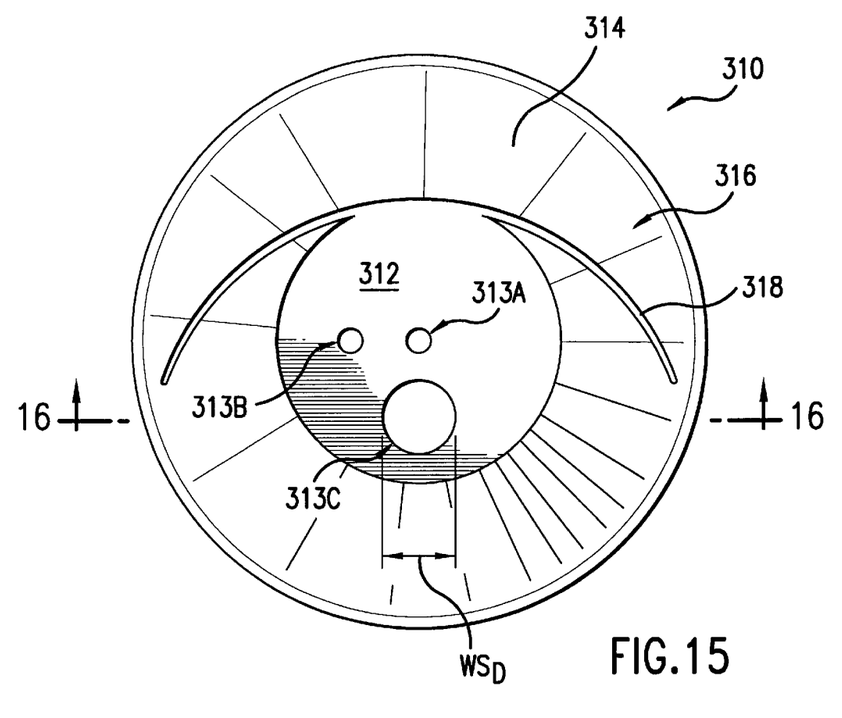
FIG. 15 is a top view of the fiber winding structure of FIG. 9.
Figure 16:
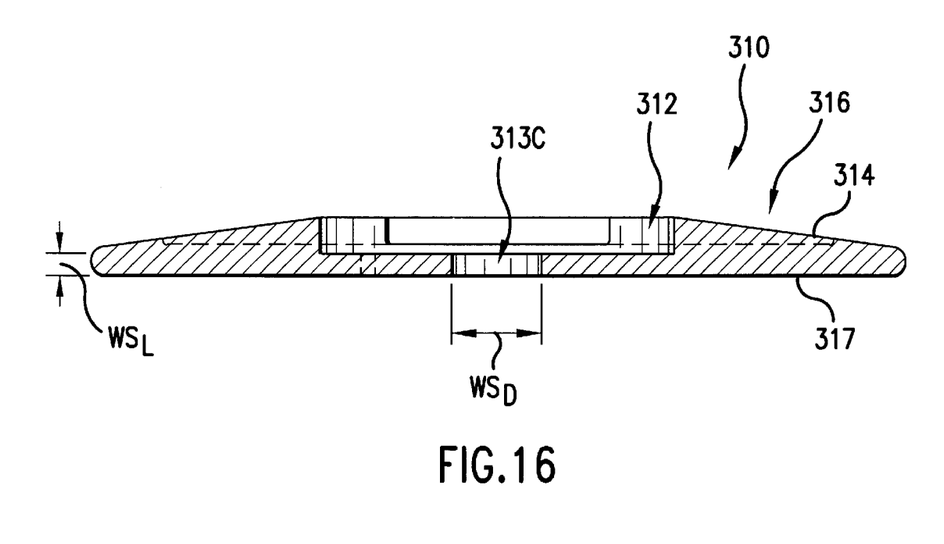
FIG. 16 is a cross-sectional view of the fiber winding structure as taken along line 16—16 of FIG. 15.

FIGS. 15 and 16 illustrate a second embodiment for fiber winding structure 310. As in the previously disclosed embodiment for the fiber winding structure, fiber winding structure 310 includes a first side 316, or fiber winding side, and a second side, or underside, 317, to which is attached handle member 320. First side 316 of winding structure 310 defines a recess 312 and a winding surface 314. Included in winding surface 314 is groove 318. Within recess 312 are mounting member aperture 313A and securement aperture 313B. Mounting member aperture 313A receives within it threaded portion 334 of mounting member 330. Threaded portion 334 extends through aperture 313A where it is received within aperture 324 in handle member 320. One difference in the embodiment for fiber winding fixture 300 as opposed to fiber winding fixture 100, as previously disclosed, is that, in this embodiment, mounting member 330 is mounted to handle member 320 from a position above winding structure 310 such that mounting member 330 rigidly mates winding structure 310 with handle member 320.

Securement member 350 is received through securement aperture 313B where it is received within aperture 326 of handle member 320. Retaining member 340 is mounted on mounting member 330.

As can be seen in FIGS. 15 and 16, fiber winding structure 310 includes a third aperture 313C within recess 312. As discussed previously, aperture 313C receives within it a top portion of upper end 362 of push button 360. Thus, aperture 313C has a diameter $WS_D$ of 0.745 inches, which is able to accommodate upper end 362 of push button 360, which has a diameter of 0.715 inches, through it. However, because the diameter of aperture 313C is less than the diameter of first upper portion 328A of aperture 328 in handle member 320, when biasing member 370 is positioned within first upper portion 328A of aperture 328 it is restrained from moving up through aperture 313C by the structure of fiber winding structure 310 which serves to define aperture 313C. As can be seen in FIG. 16, and as was described previously, the structure of fiber winding structure 310 which defines aperture 313C has a thickness $WS_L$ of 0.193 inches, which is equivalent to the distance that upper end 362 of push button 360 extends above handle member 320 and into aperture 313C. Thus. as was also described previously, when push button 360 is biased into its first position within handle member 320, upper end 362 of push button 360 does not extend up into recess 312, but rather, its top end 362A is positioned flush with the structure of fiber winding structure 310 which defines the lower surface of recess 312.

Figure 17:
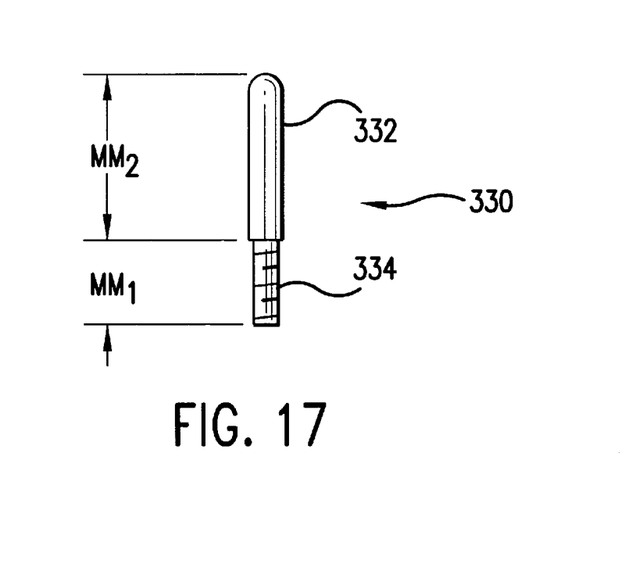
FIG. 17 is a side view of the mounting member of FIG. 9.

FIG. 17 illustrates mounting member 330. Mounting member 330 includes a first mounting portion 332 and a second threaded portion 334. Threaded portion 334 has a length $MM_1$ of 0.6 inches and is thus able to be received through mounting member aperture 313A in fiber winding structure 310 and received within aperture 326 of handle member 320. Mounting portion 332 has a length $MM_2$ of 0.960 inches and a diameter of 0.250 inches. Thus, because the diameter of aperture 313A in fiber winding structure 310 has a diameter of 0.196 inches and threaded portion 334 of mounting member 330 has a diameter of 0.190 inches, threaded portion 334 is able to be inserted through mounting member aperture 313A, but yet, because mounting portion 332 has a larger diameter than the diameter of aperture 313A, mounting member 330 is not able to be inserted completely through aperture 313A. Thus, as described previously, mounting member 330 is inserted through fiber winding structure 310 and into handle member 320 in order to rigidly secure together mounting member 330, fiber winding structure 310, and handle member 320. As can be understood, before securing fiber winding structure 310 to handle member 320 by utilizing mounting member 330, push button 360 with biasing member 370 disposed around it is inserted into aperture 328 in handle member 320. Thus, push button 360 is biased into its first position by biasing member 370 when fiber winding structure 310 is mated with handle member 320.

FIG. 18 illustrates the fiber winding fixture 300 without a fiber storage device 400 inserted within recess 312 of winding structure 310. As can be understood, and as was described previously, with push button 360 in its first position where it does not extend into recess 312, a fiber storage device 400 may be inserted into recess 312 for winding an optical fiber onto it as described previously. As can be seen in FIG. 18, push button 360 is biased into its first position by biasing member 370. Biasing member 370 is disposed around push button 360 and its upper end engages with fiber winding structure 310 and its lower end engages with the circumferential rim 366 of push button 360. Thus, push button 360 is biased into a position where circumferential rim 366 engages with ledge 328C that is defined by handle member 320. In this first position, the top surface 362A of push button 360 is flush with the surface of fiber winding structure 310 that defines the lower surface of recess 312. Thus, push button 360 does not extend within recess 312 and a fiber storage device 400 may be positioned within recess 312.

Figure 19:
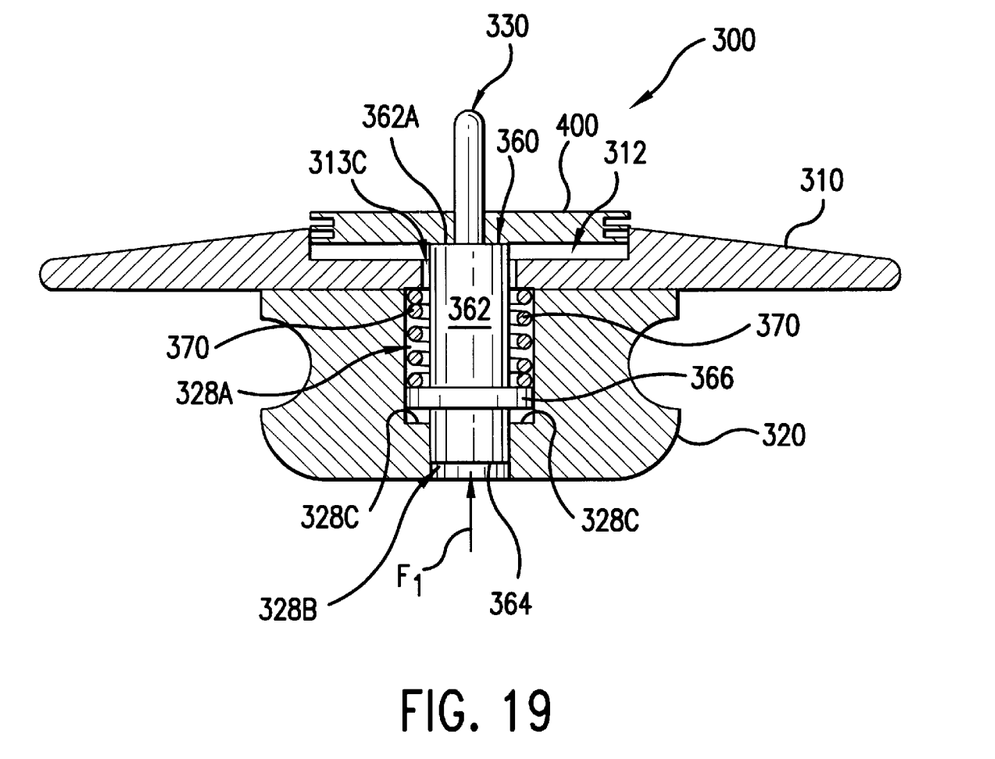
FIG. 19 is a cross-sectional view of the second embodiment for the fiber winding fixture in an assembled configuration where the push button is in its second position.

Push button 360 may be utilized to assist a user in removing fiber storage device 400 from recess 312. Push button 360 may be utilized to at least partially eject fiber storage device 400 from recess 312 such that it may be easier for a user to grasp fiber storage device 400 and completely remove it from fiber winding fixture 300. FIG. 19 illustrates push button 360 in its second position where it assists a user to remove fiber storage device 400 from recess 312. As can be seen, a force $F_1$ is applied to the lower end 364 of push button 360 by a user. Because aperture 328 in handle member 320 extends completely through handle member 320, a user is able to apply a force to the bottom of lower end 364, such as for example, by pressing up on lower end 364 with the user's hand. As force $F_1$ is applied to push button 360, the force overcomes the biasing force applied by biasing member 370 to push button 360. Thus, top surface 362A of push button 360 extends up into recess 312 and engages with fiber storage device 400. By moving push button 360 into this second position, push button 360 at least partially ejects fiber storage device 400 from recess 312 such that a user may grasp the fiber storage device and completely remove it from the fiber winding fixture 300. After the fiber storage device 400 has been removed from the fiber winding fixture 300, the user removes the force $F_1$ from push button 360 and biasing member 370 returns push button 360 to its first position where circumferential rim 366 engages with ledge 328C, which in-turn withdraws top surface 362A, and thus upper end 362 of push button 360, from recess 312.

Thus, as described above, the inclusion of push button 360 and biasing member 370 within handle member 320 assists a user in removing a fiber storage device 400 from the fiber winding fixture 300. Whereas the disclosed embodiment includes a biasing member to return push button 360 to its first position, it is not required that a biasing member be utilized with the present invention. If a biasing member was not utilized, after the user removes the force on the push button to withdraw the push button from the recess in the fiber winding structure, the force of gravity acting on the push button will return the push button to its first withdrawn position.

It is not required that the handle member in this second embodiment be formed as illustrated. Any of a variety of structures could accommodate a push button for assisting a user in removing a fiber storage device from the fiber winding fixture.

The fiber storage device can be manufactured from any of a variety of materials including plastics and/or metals. Similarly, both embodiments of the fiber winding fixture may be made from either a plastic or a metal material. For example, the fiber winding fixture could be manufactured from an anti-static material such as Pomalux®-SD-A, which is manufactured by the Westlake Plastic Company, or a nylon material. The fiber storage device can be coated with an anti-wear Teflon® coating such as NEDOX® which is available from General Magnaplate, Inc.

The disclosed embodiments are illustrative of the various ways in which the present invention may be practiced. Other embodiments can be implemented by those skilled in the art without departing from the spirit and scope of the present invention.

What is claimed is:

1. A fiber winding fixture comprising:
   a winding structure having a first side and a second side, said first side defining a recess therein and including a winding surface, said winding surface extending from said recess at a first location to an outer diameter of said winding structure at a second location, said winding surface sloping from said first location to said second location;
   a handle member, said handle member disposed on said second side of said winding structure;
   a push button, said push button movably disposed within said handle member; and
   a biasing member, said biasing member disposed around a first portion of said push button.

2. The fiber winding fixture of claim 1 further comprising a mounting member, said mounting member disposed within said recess of said winding structure and extending perpendicularly therefrom.

3. The fiber winding fixture of claim 2 further comprising a retaining member, said retaining member attached to said mounting member.

4. The fiber winding fixture of claim 2 further comprising a securement member, said securement member disposed within said recess of said winding structure and extending perpendicularly therefrom and wherein said mounting member is centrally disposed within said recess of said winding structure and said securement member is positioned off-set from a central axis of said recess.

5. The fiber winding fixture of claim 1 wherein said first side of said winding structure defines a groove.

6. In combination with the fiber winding fixture of claim 2, a fiber storage device comprising:
   a support structure having a central axis, said support structure defining a mounting aperture extending therethrough, said mounting aperture aligned with said central axis;
   said support structure including:

a first storage track disposed on an outer circumference of said support structure; and a second storage track disposed on said outer circumference of said support structure;

wherein said fiber storage device is received within said recess of said winding structure and wherein said mounting member is received within said mounting aperture.

7. The fiber winding fixture and fiber storage device of claim 6 wherein when said fiber storage device is received within said recess of said winding structure one of said first and second storage tracks is disposed within said recess and at least a portion of the other of said first and second storage tracks is disposed outside of said recess.

8. The fiber winding fixture and fiber storage device of claim 6 wherein said support structure defines a plurality of securement apertures wherein each of said securement apertures are off-set from said central axis of said support structure.

9. The fiber winding fixture and fiber storage device of claim 6 wherein a wall separates said first storage track from said second storage track and wherein said wall defines an opening therethrough.

10. A fiber winding fixture for winding fiber onto a fiber storage device wherein the fiber storage device includes a first storage track and a second storage track, comprising:

a winding structure having a first side, a second side, and an aperture extending therethrough, said first side defining a recess therein wherein said recess receives within it the fiber storage device and wherein when the fiber storage device is received within said recess one of the tracks of the fiber storage device is disposed within said recess and at least a portion of the other of the tracks extends above said recess;

a securement structure, said securement structure disposed on said second side said winding structure; and a push button, said push button movably disposed within said securement structure between a first position and a second position wherein when said push button is in said second position a portion of said push button extends through said aperture and within said recess in said winding structure.

11. The fiber winding fixture of claim 10 further comprising a biasing member, said biasing member disposed on said push button and biasing said push button into said first position.

12. The fiber winding fixture of claim 10 further comprising a mounting member, said mounting member disposed within said recess of said winding structure.

13. The fiber winding fixture of claim 10 wherein said securement structure is a handle.

14. The fiber winding fixture of claim 12 further comprising a retaining member, said retaining member attached to said mounting member.

15. The fiber winding fixture of claim 10 wherein said first side of said winding structure includes a winding surface, said winding surface sloped from said recess to an outer diameter of said winding structure.

16. The fiber winding fixture of claim 15 wherein said winding surface defines a groove.

17. The fiber winding fixture of claim 16 wherein said groove extends around a portion of said winding surface.

18. A method for winding a length of optical fiber on a fiber storage device, wherein the fiber storage device includes a first storage track and a second storage track, comprising the steps of:

winding a first portion of the length of optical fiber in the first storage track of the fiber storage device;

placing the fiber storage device into a recess defined by a fiber winding fixture;

winding a second portion of the length of optical fiber in the second storage track of the fiber storage device; and partially ejecting the fiber storage device from the fiber winding fixture by engaging the fiber storage device with a push button movably mounted in the fiber winding fixture.

19. The method of claim 18 wherein when said fiber storage device is placed into said recess defined by said fiber winding fixture said first storage track of said fiber storage device is disposed within said recess and at least a portion of said second storage track is disposed outside of said recess.

20. The method of claim 18 wherein said fiber winding fixture includes a groove and further comprising the step of placing at least a portion of an end of said first portion of the length of optical fiber in said groove.

21. The method of claim 18 further comprising the step of restraining said fiber storage device against rotation within said recess defined by said fiber winding fixture.

22. The method of claim 18 further comprising the step of locking said fiber storage device within said fiber winding fixture.

23. The method of claim 18 further comprising the step of aligning said fiber storage device within said recess defined by said fiber winding fixture.

\* \* \* \* \*